United States Patent [19]

Hsieh

[11] Patent Number: 4,983,554

[45] Date of Patent: Jan. 8, 1991

[54] SILICON NITRIDE CERAMIC CONTAINING MOLYBDENUM DISILICIDE

[75] Inventor: Martin Y. Hsieh, Palo Alto, Calif.

[73] Assignee: GTE Products Corporation, Stamford, Conn.

[21] Appl. No.: 459,865

[22] Filed: Jan. 2, 1990

[51] Int. Cl.⁵ .............................................. C04B 35/58
[52] U.S. Cl. ........................................ 501/97; 501/98
[58] Field of Search .................................... 501/97, 98

[56] References Cited

U.S. PATENT DOCUMENTS 4,407,971 10/1983 Komatsu et al. ...................... 501/97
4,873,210 10/1989 Hsieh ..................................... 501/97

Primary Examiner—Mark L. Bell
Attorney, Agent, or Firm—James Theodosopoulos

[57] ABSTRACT

A sintered silicon nitride ceramic having high stiffness consists of, in weight percent, 10.1 to 13.5 aluminum nitride, 6 to 7.5 yttrium oxide, 0.05 to 5 molybdenum disilicide, balance silicon nitride.

4 Claims, No Drawings

SILICON NITRIDE CERAMIC CONTAINING MOLYBDENUM DISILICIDE

This invention concerns sintered silicon nitride ceramics. It is particularly concerned with providing such a ceramic having high stiffness. Young's Modulus (Y.M.) is a measure of stiffness. Hot pressed silicon nitrides typically have a Y.M. at room temperature of 42 to 44 mpsi (million pounds per square inch). Examples of hot pressed silicon nitrides are shown in U.S. Pat. Nos. 4,332,909, 4,350,771, 4,365,022, 4,401,768 and 4,749,539. Reaction sintered silicon nitrides typically have a Y.M. of 15 to 30 mpsi. Examples of reaction sintered silicon nitrides are shown in U.S. Pat. Nos. 4,351,787, 4,377,542 and 4,388,414. Pressureless sintered silicon nitrides typically have a Y.M. of 40 to 44 mpsi. Examples of pressureless sintered silicon nitrides are shown in U.S. Pat. Nos. 4,376,652, 4,379,110, 4,383,958, 4,400,427, 4,407,971 and 4,412,009. Sialons typically have a Y.M. of 42–45 mpsi. Examples of sialons are shown in U.S. Pat. Nos. 4,331,771, 4,438,051 and 4,563,433.

I have found that by adding a small amount of molybdenum disilicide ($MoSi_2$) to a preferred silicon nitride composition, the stiffness (Y.M.) can be significantly increased. The preferred silicon nitride composition is, in weight percent, 10.1 to 13.5 aluminum nitride (AlN), 6 to 7.5 yttrium oxide ($Y_2O_3$), balance silicon nitride ($Si_3N_4$). The small amount of $MoSi_2$ is 0.05 to 5 weight percent.

U.S. Pat. No. 4,407,971 discloses a ceramic of, in weight percent, 0.1 to 10 yttrium oxide, 0.1 to 10 aluminum oxide, 0.1 to 10 aluminum nitride, 0.1 to 5 molybdenum silicide, balance silicon nitride; see the Abstract and column 2, lines 20–32. The patent discloses, however, that the $MoSi_2$ is added to aid the sintering promoters and to protect the sintered body against lowering mechanical strength; see column 2, line 63 to column 3, line 4.

One example of a silicon nitride composition evaluated for stiffness, in accordance with this invention consisted of, in weigth percent, 6.23 $Y_2O_3$, 12.45 AlN, 81.32 $Si_3N_4$. Four hundred grams of this powder mixture were ball milled in a four gallon jar with one inch silicon nitride grinding media. Rectangular bars, about 230 mils by 400 mils by 3.15", were dry pressed at 5000 psi and then isostatically pressed at 20,000 psi at room temperature. The bars were fired in one atmosphere nitrogen flowing gas for four hours at 1700° to 1800° C. The bars were embedded in setter powder of their own composition during firing and in a silicon nitride crucible. The Y.M. for this example was 45 mpsi. When 0.1 wt % $MoSi_2$ was added to the powder mixture, the Y.M. increased to 48.5 mpsi. The addition of 2 wt % increased Y.M. to 47.2 mpsi.

I claim:

1. A sintered silicon nitride ceramic consisting of, in weight percent, 10.1 to 13.5 aluminum nitride, 6 to 7.5 yttrium oxide, 0.05 to 5 molybdenum disilicide, balance silicon nitride.

2. The ceramic of claim 1 consisting of 12.45 AlN, 6.23 $Y_2O_3$, 0.1 $MoSi_2$, balance $Si_3N_4$.

3. The ceramic of claim 1 consisting of 12.45 AlN, 6.23 $Y_2O_3$, 2 $MoSi_2$, balance $Si_3N_4$.

4. A sintered silicon nitride ceramic having high stiffness made by: ball milling a powder mixture of, in weight percent, 10.1 to 13.5 AlN, 6 to 7.5 $Y_2O_3$, 0.05 to 5 $MoSi_2$, balance $Si_3N_4$; pressing the powder mixture at room temperature; and firing the pressed mixture in a nitrogen atmosphere at 1700° to 1800° C.

* * * * *